3,287,095
MANUFACTURE OF GLASS
James Peter Procter, Manchester, Horace Cole, St. Helens, and Brian Yale, Salford, England, assignors to Pilkington Brothers Limited, Liverpool, England, a corporation of Great Britain
No Drawing. Filed Sept. 19, 1962, Ser. No. 224,852
Claims priority, application Great Britain, Aug. 22, 1958, 27,107/58
2 Claims. (Cl. 65—2)

This application is a continuation-in-part of our copending application Serial No. 833,938 filed August 17, 1959 and now abandoned.

This invention relates to the manufacture of "soda-free" glass having a boron-containing component; such glass is referred to as "borosilicate" glass and although it is said to be soda-free, it generally contains a small proportion, say, up to 2% of soda as an unavoidable impurity.

It is a main object of the present invention to provide a "soda-free" borosilicate glass which is substantially free from seed, that is to say bubbles of undissolved gas, and from dissolved gas which may later come out of solution to form bubbles.

More particularly it is an object of the present invention to improve the manner of manufacture of "soda-free" borosilicate glass in order to prevent seed forming in the glass and also to avoid the presence of dissolved gas.

The formation of seed and the presence of dissolved gas in the glass are undesirable phenomena which may occur in the manufacture of glass of any composition. The most common causes of both phenomena are the presence in the batch, during manufacture of the glass, of water vapour and carbon dioxide, and accordingly many methods have previously been proposed for removing these two gases from the molten glass or from the batch materials before melting. For example, it is customary to subject molten glass to a fining process in order to eliminate seed, but this is an expensive treatment and does not remove all the dissolved gas from the molten glass.

Another proposal has been to subject the batch to a preliminary heating at a temperature well below the melting temperature of the batch ingredients, at the same time passing through and over the heated batch a current of air which is substantially free from both water vapour and carbon dioxide.

However, it has been found in practice that none of the methods proposed hitherto has been effective in providing a manufacturing process of producing a "soda-free" borosilicate glass which is free of seed and of dissolved gas.

"Soda-free" borosilicate glass is important because of the properties imparted to the glass by the presence of a proportion of boron oxide.

Boron oxide has previously been employed as a glass component for the purpose of enhancing the electrical properties, weathering properties, and chemical- and heat-resistance properties of the glass, and also in the case where the glass is formed into fibres in order to obtain glass of the optimum viscosity at temperatures above the liquidus temperature. Its efficacy for these purposes is partly due to its intrinsic qualities and partly due to the fact that it acts as a flux in the batch from which the glass is made, so that soda, which is the most commonly used flux but leads to poor weathering properties and so on, can be eliminated from the batch.

The use of boron oxide as a component of glass in the manufacture of glass filaments not only assists melting, as mentioned above, but it also has the effect of increasing the working range of the molten glass which is particularly valuable in the production of the filaments used in the manufacture of multi-filament strands of glass, and boron oxide therefore has been an important component of glass intended for this purpose.

Either boron oxide ($B_2O_3$) or boric acid has hitherto invariably been used as the boron-containing constituent of the batch. Boron oxide is a very hygroscopic material and hydrates in a matter of minutes in an atmosphere containing any moisture. Hydration of boric oxide is a chemical process in which the water combines with the boric oxide to form boric acid, and therefore, in normal circumstances, there is no practical difference between boron oxide and boric acid, which may both be considered as boric acid.

As has already been stated, "soda-free" borosilicate glass is particularly used in the manufacture of glass fibres and filaments. The formation of seed is particularly to be avoided in a glass which is to be drawn into filaments, while the presence of dissolved gas in such a glass can be more troublesome than seed. The reason for this is that, when the glass is remelted in the filament-forming bushing, particularly if such remelting is effected at a temperature higher than that used during manufacture or fining of the glass, the dissolved gas comes out of solution in the glass, this phenomenon being known as "reboil," and forms bubbles which are liable to interrupt production of the filaments.

The dissolved gas in molten glass obtained from boric acid-containing batch is largely formed of occluded water vapour and the boric acid is the principal source of this water vapour. Boric acid contains a high proportion of chemically combined water and this water content becomes occluded in the batch when the latter is introduced into the melting furnace owing to the initial fritting or glazing of the batch which prevents the water vapour escaping.

It is a further particular object of the present invention to improve the manner of manufacture of "soda-free" borosilicate glass to prevent water vapour being occluded in the molten glass obtained from the "soda-free" borosilicate glass batch.

The present invention is based on the realization that commercially practicable processes for removing water which may be present as free water, i.e. moisture condensed on the particles constituting the glass batch, or as associated water in the particles, i.e. water of crystallization, are ineffective for removing chemically-combined water such as is present in boric acid.

Accordingly the present invention provides that the boron-containing constituent of a glass batch for the manufacture of a "soda-free" borosilicate glass shall be a metallic borate or a metallic borosilicate, which compounds are free of chemically-combined water.

According to one aspect of the present invention a method of manufacturing "soda-free" borosilicate glass is characterized in that the batch employed contains an anhydrous metallic borate or metallic borosilicate as the sole boron-containing component of the batch.

As such borates and borosilicates do not contain chemically combined water and are employed in the anhydrous state, they cannot act as a source of water vapour in the batch during melting, as does boric acid. Suitable borates and borosilicates for use in the method according to the invention are, for example, those of calcium, which is preferred, aluminum and magnesium. These borates and borosilicates are all capable of acting as fluxes in a similar manner to the boric acid heretofore employed.

The metallic borates and metallic borosilicates can also be employed in the form of the hydrated compounds, that is as the compounds including water of crystallization, provided that the batch is pre-heated to drive off such water of crystallization and any free water before melting of the batch is effected.

According to this aspect, therefore, the present invention provides a method of manufacturing "soda-free" borosilicate glass, which comprises the step of heating a batch containing a metallic borate or metallic borosilicate as the sole boron-containing constituent to drive off any free water or water of crystallization while the components of the batch are still solid, prior to melting the batch to form molten glass.

We have further found that by suitable pretreatment of the batch while it is still in the solid state, the rate of melting of the batch in the melting furnace can be considerably expedited.

According to a preferred feature of the invention therefore, the batch (containing the metallic borate or metallic borosilicate) is maintained prior to melting at a temperature and for a time sufficient to complete chemical reaction between the components while the batch as a whole remains solid, and the reacted batch constituting embryo glass so formed is subsequently converted into the molten state.

Where both the dehydration step described above and the pre-reaction step are applied to the batch, they are preferably effected as a continuous thermal treatment of the batch.

A suitable temperature for such pre-treatment of calcium borate-containing borosilicate batch is 925° C. and not greater than 950° C. and the time required to complete reaction at this temperature depends on the particle size of the batch components; the finer the particles the shorter the time required. For example for particles of 200 mesh sieve, the time of reaction is about an hour. It is therefore preferred that where the batch is pre-reacted in this manner, the batch components should be ground so that they pass through a 200 mesh sieve (i.e. 200 meshes per linear inch).

Previous boric acid-containing glass making batches employed in the manufacture of glass filaments usually have had as principal constituents, silica, calcium oxide, magnesium oxide and aluminum oxide in addition to boric acid, in relative proportions within the range:

| | Percent |
|---|---|
| Silica | 50–67 |
| Calcium oxide | 15–30 |
| Magnesium oxide | 0–7 |
| Aluminum oxide | 7–17 |
| Boric oxide | 6–10 | together with minor proportions of fluorspar, calcium sulphate, magnesite, china clay and chalk, and may be considered as a high lime high alumina borosilicate batch which is free or substantially free of sodium. Where the boric acid component of such a batch is replaced by, for example, calcium borate in accordance with the present invention, a corresponding reduction in the calcium oxide content of the batch is desirable in order to retain the relative proportion of calcium in the batch.

The present invention therefore also comprises as a new composition of matter, a glass batch having as principal constituents, silica, calcium oxide, magnesium oxide, aluminum oxide and either a metallic borate or a metallic borosilicate as the sole boron-containing constituent.

In particular the present invention comprises such a new composition of matter, exemplified by the following examples in which the constituents exist in the stated relative proportions by weight:

*Example I (calcium borate)*

| | Percent |
|---|---|
| Silica | 50–67 |
| Calcium oxide | 9.6–22.9 |
| Magnesium oxide | 0–7 |
| Aluminum oxide | 7–17 |
| Calcium borate | 14.4–16.1 |

*Example II (calcium borosilicate)*

| | Percent |
|---|---|
| Silica | 45–52 |
| Calcium oxide | 7.6–16.9 |
| Magnesium oxide | 0–7 |
| Aluminum oxide | 7–17 |
| Calcium borosilicate | 10–30 |

*Example III (magnesium borate)*

| | Percent |
|---|---|
| Silica | 50–67 |
| Calcium oxide | 16.1–30.1 |
| Magnesium oxide | 0–2 |
| Aluminum oxide | 7–17 |
| Magnesium borate | 11–13 |

*Example IV (magnesium boro-silicate)*

| | Percent |
|---|---|
| Silica | 45–52 |
| Calcium oxide | 9.6–22.9 |
| Magnesium oxide | 0–2 |
| Aluminum oxide | 7–17 |
| Magnesium boro-silicate | 9–29 |

*Example V (aluminum borate)*

| | Percent |
|---|---|
| Silica | 50–67 |
| Calcium oxide | 16.1–30.1 |
| Magnesium oxide | 0–7 |
| Aluminum oxide | 0–4 |
| Aluminum borate | 19.5–22 |

*Example VI (aluminum boro-silicate)*

| | Percent |
|---|---|
| Silica | 45–54 |
| Calcium oxide | 9.6–22.9 |
| Magnesium oxide | 0–7 |
| Aluminum oxide | 3–7 |
| Aluminum boro-silicate | 12–32 |

In particular a borosilicate batch comprises metallic borate or metallic borosilicate as the sole boron-containing constituent in which the components of the batch pass through a 200 mesh sieve.

From the preceding statements, it will have been understood that the practice of thte present invention, which results in the formation of a "soda-free" borosilicate glass which is free of seed and also devoid of dissolved gas, lies in steps which are taken before the ingredients of the glass batch have melted. The procedure which is followed after the formation of the molten glass, for example in manufacturing filaments or fibres from the glass, forms no part of the present invention, although it is in the improved quality of the glass filaments that the effectiveness of the invention is most readily shown.

The procedure followed for forming filaments from the molten glass may be any procedure conventionally followed, for example one of the methods described in Chapter 21 of the Glass Engineering Handbook by E. B. Shand, second edition, 1958.

Some of these methods involve the use of marbles. That is to say that the appropriate batch is fed to a glass melting furnace where the batch is melted, the molten glass obtained is formed into marbles and the latter are then passed to a bushing where the glass is re-melted and from which the filaments are formed. While this procedure may be employed with a metallic borate or metallic borosilicate-containing batch according to the invention, it is possible where the batch has been pre-reacted as described above, to feed the pre-reacted batch directly to the bushing, thus omitting the steps of melting the batch in a glass melting furnace and forming the molten glass so obtained into marbles. This shortened procedure is possible because molten boron oxide-containing glass containing substantially no dissolved gas can be obtained directly from the batch by means of the present invention, without any extended fining of the molten glass, and because the pre-reaction treatment described above gives a reacted batch which can be melted rapidly. The omission of the steps of preliminary melting and marbling considerably reduces the time and cost of glass filament manufacture.

The present invention accordingly comprises a method of manufacturing filaments of soda-free borosilicate glass in which the batch employed contains a metallic borate or metallic borosilicate as the sole boron-containing constituent and the batch components are preferably finely ground so that they all pass through a 200 mesh sieve, the batch is maintained at a temperature and for a time sufficient to complete chemical reaction between the components while the batch as a whole remains solid, and the reacted batch is then fed direct to the bushing.

In the manufacture of glass filaments it is important that the presence of undissolved particles of batch in the molten glass should be avoided as far as possible, as the presence of such particles in the formed filaments renders them very liable to breakage. Even though a reacted batch, which melts rapidly, is employed, in the foregoing glass filament production method it is possible that in certain types of bushing undissolved batch may pass directly to the tips and be included in the filaments. It is therefore preferred to employ a bushing which is so designed that this cannot occur; a suitable bushing of this type is described in United Kingdom specification No. 482,532 with reference to FIGURES 1 to 3.

In detail and purely by way of example, a method of forming a molten "soda-free" borosilicate glass according to the invention, and thereafter producing glass filaments from the molten glass, commences with the selection and mixing of a batch containing calcium borate as the sole boron-containing constituent. This batch will have proportions of ingredients falling within the ranges given in Example I, for example:

|  | Percent |
|---|---|
| Silica | 55 |
| Calcium oxide | 12 |
| Magnesium oxide | 5 |
| Aluminum oxide | 13 |
| Calcium borate | 15 |

When the batch ingredients have been thoroughly mixed, they are ground so that they will pass through a 200 mesh sieve.

The process is preferably carried out as a continuous process. The ground batch ingredients are therefore conveyed through a heating stage, conveniently at a temperature of 925° C. The rate at which the ground batch ingredients are conveyed through the heating stage is such that the mixed and ground batch is subjected to the temperature of 925° C. for about an hour.

During the heat treatment two processes are completed. In the first place any free water and any water of crystallization in the batch ingredients are expelled, so that the batch ingredients are completely free from moisture. Secondly the maintenance of the particles forming the batch at the temperature of 925° C. for a period of 1 hour causes the ingredients to react together without any melting or the formation of any lasting liquid phase to form an embryo glass.

The reacted batch, i.e. the embryo glass is then fed into the melting chamber of a bushing where it is heated to a temperature of 1500° C. and molten glass is formed. The bushing employed is the bushing shown in the U.K. specification No. 482,532 already referred to, and has a capacity of approximately 20 lbs. of glass. After melting, the molten glass passes through the refining element and ultimately issues through the outlets of the bushing in the form of glass filaments.

The temperature of the molten glass as it issues from the outlets or tips of the bushing is about 1230° C., although this temperature will vary according to the size of the filaments being drawn.

The general description of the process which has been given including the temperatures of the various stages are particularly mentioned with regard to a calcium borate batch, but the temperatures will be substantially the same if the batch is one falling within the ambits of Examples II to VI of this specification. However, the melting temperature may well vary in individual cases, depending on the physical characteristics of the material of the batch, although the melting temperature will generally be in the range from about 1250° C. to about 1750° C.

It will be appreciated that since the process is a continuous process, it is not possible to state exactly how long any one portion of the batch will remain in the bushing, but in general the output of the bushing is approximately 10 lbs. of glass per hour.

The temperatures of the platinum portions of the bushing itself are not specifically known, but these will vary in any case according to the type of bushing used. The figures for the temperatures quoted, however, are thought to be the approximate temperatures of the molten glass in the hottest part of the bushing and at the tips.

From the general ranges of ingredients of the borosilicate glass quoted above, it will be appreciated that magnesium oxide is not an essential ingredient of the glass. The ranges of ingredients of a batch according to the invention containing calcium borosilicate as the sole boron-containing constituent and having no magnesium oxide content are:

|  | Percent |
|---|---|
| Silica | 45–52 |
| Calcium oxide | 7.6–23.9 |
| Aluminum oxide | 7–17 |
| Calcium borosilicate | 10–13 |

Borosilicate glasses containing no magnesium oxide have a reduced liquidus temperature as compared with similar glasses including magnesium oxide. One specific example of a batch according to the invention, but containing no magnesium oxide, is as follows:

|  | Percent |
|---|---|
| Silica | 51 |
| Calcium oxide | 20 |
| Aluminum oxide | 16 |
| Calcium borosilicate | 13 |

A glass according to this batch is manufactured by a method similar to that described above for a calcium borate batch.

By means of the present invention soda-free borosilicate glass which is substantially free from dissolved gas can be obtained in a more simple and a more economical manner than hitherto and glass filaments can be produced by a cheaper and more flexible process.

Soda-free borosilicate glass according to this invention also has other applications, for example in optical units which are exposed to the weather, and in which the formation of seed in the glass has particularly to be avoided.

We claim:

1. A method of manufacturig "soda-free" borosilicate glass consisting essentially of a predominating proportion of silica and lesser proportions of oxides selected from the group consisting of calcium oxide, magnesium oxide, aluminum oxide, and boron oxide, which comprises the step of heating a batch containing the ingredients of the glass, the proportion of the silica present being greater than that of any other ingredient, the batch being substantially free from sodium compounds, and the sole boron-containing constituent of the batch being aluminum borosilicate, to a temperature in the range from 600° C. to 1000° C. to drive off any free water or water of crystallization while the components of the batch are still solid prior to melting the batch to form molten glass, and subsequently heating the batch to a temperature in the range from about 1250° C. to about 1750° C.

in order to melt the batch ingredients and form molten glass.

2. A method of manufacturing filaments of "soda-free" borosilicate glass consisting essentially of a predominating proportion of silica and lesser proportions of oxides selected from the group consisting of calcium oxide, magnesium oxide, aluminum oxide and boron oxide by drawing filaments of molten glass from a bushing, characterised in that the sole boron-containing constituent of the batch employed is aluminum borosilicate, the batch contains a proportion of silica greater than that of any other ingredient, the batch is substantially free from sodium compounds, the batch is maintained at a temperature not greater than 950° C. for a time sufficient to complete chemical reaction between the components while the batch as a whole remains solid, and the reacted batch is then fed direct to the melting chamber of the bushing, where it is heated to a temperature of about 1500° C. in order to melt the batch ingredients and form the molten glass which is subsequently drawn from the bushing as filaments.

References Cited by the Examiner
UNITED STATES PATENTS

| | | | |
|---|---|---|---|
| 1,736,642 | 11/1929 | Beaudry | 106—54 |
| 2,155,721 | 4/1939 | Lee | 106—54 |
| 2,681,289 | 6/1954 | Moore | 106—54 |
| 3,082,102 | 3/1963 | Cole et al. | 106—54 |

FOREIGN PATENTS

| | | |
|---|---|---|
| 239,349 | 9/1925 | Great Britain. |
| 393,907 | 6/1933 | Great Britain. |

TOBIAS E. LEVOW, *Primary Examiner.*

H. McCARTHY, *Assistant Examiner.*